US007972671B2

(12) United States Patent
Riordan et al.

(10) Patent No.: US 7,972,671 B2
(45) Date of Patent: Jul. 5, 2011

(54) ELECTRET AND CARD ASSEMBLY AND METHOD OF MANUFACTURE

(76) Inventors: Michael A. Riordan, Mansfield, LA (US); Donnie W. McVay, Jefferson, TX (US)

( * ) Notice: Subject to any disclaimer, the term of this patent is extended or adjusted under 35 U.S.C. 154(b) by 1263 days.

(21) Appl. No.: 11/513,947

(22) Filed: Aug. 31, 2006

(65) Prior Publication Data

US 2007/0044356 A1 Mar. 1, 2007

Related U.S. Application Data

(60) Provisional application No. 60/596,134, filed on Sep. 1, 2005.

(51) Int. Cl.
*B32B 9/00* (2006.01)
*B32B 33/00* (2006.01)

(52) U.S. Cl. ...................................... 428/40.1; 428/42.2

(58) Field of Classification Search ................. 428/40.1, 428/42.2
See application file for complete search history.

(56) References Cited

U.S. PATENT DOCUMENTS

| | | | | |
|---|---|---|---|---|
| 5,102,171 | A | 4/1992 | Saetre | 283/117 |
| 5,284,363 | A | 2/1994 | Gartner et al. | 283/81 |
| 5,643,388 | A | 7/1997 | Peterson | 156/273.3 |
| 5,699,956 | A | 12/1997 | Brennan | 229/92.8 |
| 5,888,615 | A | 3/1999 | Mascarenhas | 428/141 |
| 5,904,985 | A | 5/1999 | Ward et al. | 428/411.1 |
| 6,103,326 | A | 8/2000 | Kobayashi | 428/40.1 |
| 6,416,835 | B1 | 7/2002 | Preston et al. | 428/40.1 |
| 6,508,904 | B1 | 1/2003 | Charley | 156/249 |

*Primary Examiner* — Victor S Chang
(74) *Attorney, Agent, or Firm* — John M. Harrison

(57) ABSTRACT

This invention includes a card assembly incorporating an electrostatically charged polyolefin film, or electret, removably adhered to a paper stock or card substrate. The electret and card assembly is printable on up to four planar surfaces, with both the electret film and paper stock or card having a front and back side that is printable. When the electret is detached from the card, the charged or "static cling" electret is placeable on and self-adheres to smooth surfaces for graphic information display purposes and the printed card is then utilized for various other purposes. The electret film is removably adhered to the paper stock by a coating or "dots" of adhesive and a release agent may be applied to the back or underside of the electret to prevent premature separation and loss of electrostatic properties while maintaining optimum electret film removability. A method of manufacturing a printable electret and card assembly by integrating an electrically charged or "static cling" electret film and paper stock or card substrate using an adhesive to define a composite structure or assembly having various multiple images that may be disposed in registering relationship with respect to each other.

14 Claims, 2 Drawing Sheets

ELECTRET AND CARD ASSEMBLY AND METHOD OF MANUFACTURE

CROSS-REFERENCE TO RELATED APPLICATIONS

This application claims the benefit of and incorporates by reference U.S. Provisional Application Ser. No. 60/596,134, Filed Sep. 1, 2005.

BACKGROUND OF THE INVENTION

It is common practice to affix advertising and decorative items, along with posters, schedules, calendars and the like to refrigerators, walls and other flat vertical surfaces with tacks, magnets, tape or other adhesive materials. Consumers typically affix flexible magnets to refrigerators and such magnets often have advertising printed thereon, providing good exposure for the advertiser.

Other such items include “cling” films. The term “cling film” is commonly used to refer to a film that can cling to a substrate without the use of adhesives or fasteners. Cling films are generally divided into two major types: cling vinyl films and electrostatic cling films. Static cling vinyl, a thermoplastic film, will adhere to a smooth surface without the use of adhesives, allowing easy removal and repositioning. However, cling vinyl adherence is limited to surfaces such as glass or metal and depends on capillary more than static forces to adhere.

SUMMARY OF THE INVENTION

This invention is characterized by a combination or assembly of an electret and an underlying paper stock or card substrate, wherein the electret is characterized by an electrostatically charged or “static cling” film which may be die cut for removal of all or selected elements of the electret from the card substrate, to create graphic display products. In non-exclusive particular, direct mail postal cards incorporating an electrostatically-charged, printable film, or electret having printed graphics thereon and removably attached to a paper/paperboard or card stock, also typically printable on both sides, may be created. When separated, all or the die cut portion of the “static cling” electret display film can be placed on and will self-adhere to most smooth electrostatically opposed surfaces such as refrigerators, doors, windows and the like, for display. When all or part of the “static cling” electret element is detached, the underlying printed paper/paperboard sheet (hereinafter called “card”), which may also feature die cut indicia, affords an additional advertising medium for coupons, “mystery” offers, return cards and the like. An adhesive is applied to the card, either as a dry peel or more typically, in a selected pattern of dots and a release agent may be applied to the electret for removably securing the two assembly elements together.

Accordingly, the invention provides interactive advertising in a multi-purpose, cost-effective, magnet-free assembly which not only incorporates different materials such as a “static cling”, typically polypropylene, electret for placement and semi-permanent display, but also a printable, two-sided card substrate that can have a complimentary or different purpose. Other exemplary uses of the electret and card assembly include an assembly design wherein a major food chain might have attractive order/delivery information printed on the electret film and discount offers and coupons printed on the underlying card substrate. In similar manner, a car dealership might have a test drive “gift” enticement printed on the underlying card and hidden by the overlying electret, for a “peel and reveal” promotion, conditioned upon a customer taking a test drive. The respective electret and card assembly components thus invite interactive participation in many different applications, including magazine inserts, coupons, special offers, “secret” offers, return reply cards, various instructional data, maps, postal indicia, address information and the like.

BRIEF DESCRIPTION OF THE DRAWINGS

The invention will be better understood by reference to the following drawings, wherein:

As illustrated in FIGS. 1 and 2 of the drawings, a typical embodiment of the electret and card assembly of this invention is generally illustrated by reference numeral 1. The electret and card assembly 1 includes an electrostatically charged, polyolefin electret 2, having an electret top surface 2*a* and an electret bottom surface 2*b* and which is removably adhered to the card top surface 6*a* of a paper/paper stock substrate or card 6, having a card bottom surface 2*b*. Use of such printing techniques as UV letterpress single pass printing and the like, enables exacting registration or matching of the bottom surface electret indicia 4 on the electret 2 with the top surface card indicia 7 on the card 6, when such registration is desired. The electret 2 and card 6 are printable on up to all four planar surfaces, thus vastly increasing the useable imageable area thereon, and offering many diverse possibilities for display of graphics information and developing interactive recipient participation. In the illustration of FIGS. 1 and 2, the electret bottom surface 2*b* of the electret 2 is removably adhered to the card top surface 6*a* of the card 6 paper stock by a dry peel coating or a “dotting” of a typically hot melt, dry peel adhesive 9 provided on the card top surface 6*a* (FIG. 1). Furthermore, a typically varnish base release agent 12 (FIG. 2) can be used as necessary, on the bottom surface 2*b* of the electret 2, to contact the adhesive 9 and prevent premature separation and loss of electrostatic properties, while maintaining optimum separation of the electret 2 from the card 6. Multiple variations of the electret and card assembly 1 can be “ganged” or stacked in selected combinations, as desired.

Figure 1:
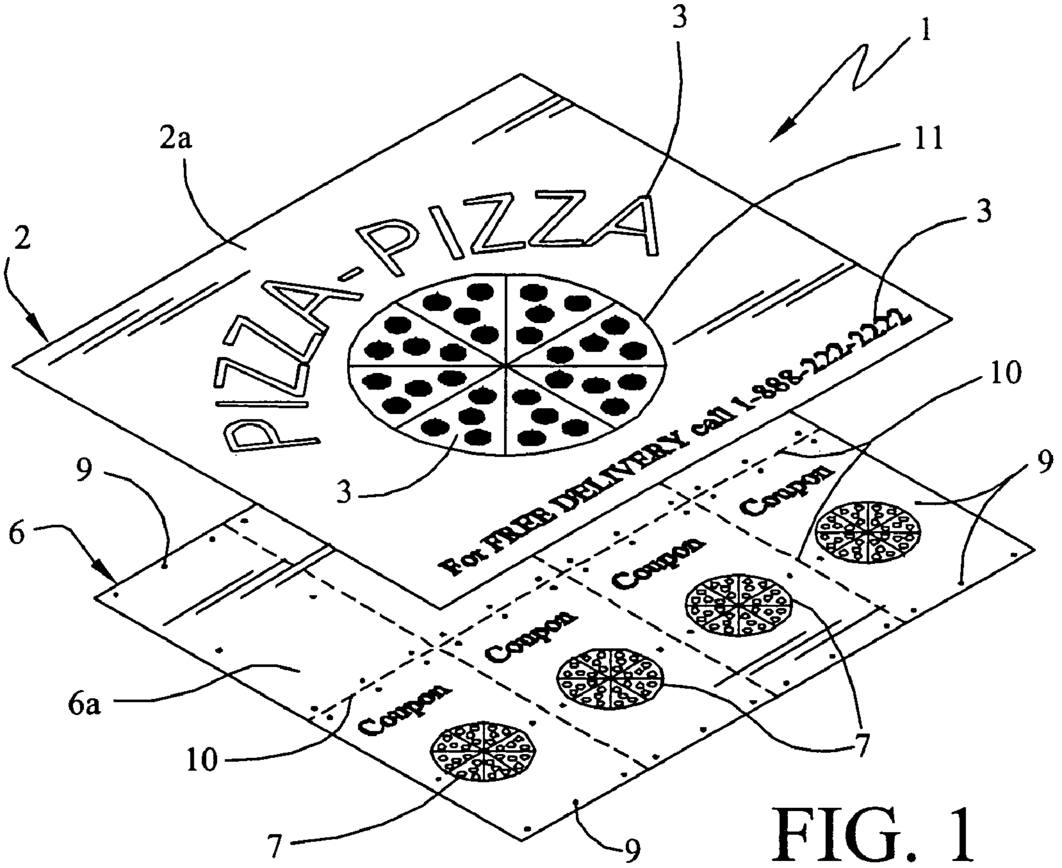
FIG. 1 is an exploded view of the front or top side of a typical electret and underlying card assembly of this invention.

The electret 2 film suitable for use in this invention is typically characterized by an electrostatic “cling” polypropylene or biopolymer polylactic acid (PLA) film of selected shape and size and having a thickness typically in the range of from about 0.001 to about 0.006 inches. The underlying paper stock or card 6 element of the inventive assembly must be printable and can be of any desired shape and size and having a thickness typically in the range of from about 0.002 to about 0.014 inches, for the intended purpose. The electret 2 film can also be transparent or translucent, thus clearly or partially revealing all or part of the top surface card indicia 7 on the underlying card 6, or it may be opaque, all or in part, thus obscuring the card information until the electret is removed from the card 6. Various scents such as perfume or the like and chemicals such as insect repellent may also be infused into the electret 2, according to the knowledge of those skilled in the art.

Referring again to FIGS. 1 and 2 of the drawings, the electret and card assembly 1 is typically characterized by an advertising informational item that facilitates use of the electret 2 and the underlying card 6 for separate purposes, when the two are separated. The top surface electret indicia 3 (FIG. 1) is designed to advertise a pizza product, including the name of the establishment, a pizza facsimile and the telephone number, with a "free delivery" notation. After removal, the "static cling" electret 2 can thus be placed on a refrigerator, for example, to act as a continuing reminder of the offered product and services. Moreover, the top surface card indicia 7 provides opportunities for the recipient of the electret and card assembly 1 to remove and use the perforated coupons in the purchase of pizza. The electret and cord assembly 1 configuration illustrated in FIG. 1 might typically be used in a hand-out advertising campaign.

Figure 2:
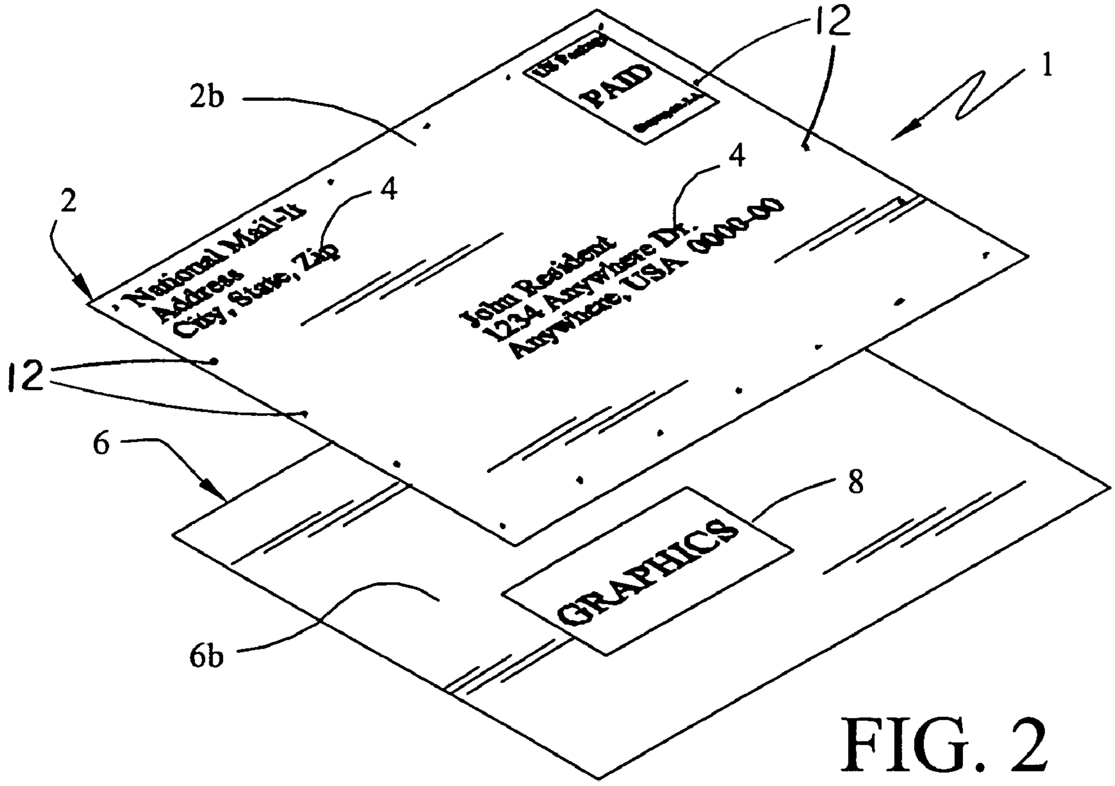
FIG. 2 is a reverse exploded view of the back or bottom side of the card and electret assembly illustrated in FIG. 1.

As illustrated in FIG. 2, the electret bottom surface 2*b*, can be provided with bottom surface electret indicia 4 that facilitates mailing of the electret and card assembly 1 to a recipient, such that the top surface electret indicia 2*a* illustrated in FIG. 1 is revealed upon removal of the electret 2 from the underlying card 6. Furthermore, the card bottom surface 6*b* illustrated in FIG. 2, may have additional advertising graphics as the bottom surface card indicia 8, as desired.

It will be appreciated by reference to FIG. 1 of the drawings that the adhesive 9 is typically, but not necessarily applied to the card top surface 6*a* in spaced-apart dots to removably secure the electret 2 on the card 6. This adhesive secures the integrity of the electret and card assembly 1 during the mailing or hand-distribution process, and yet allows easy removal of the electret 2 from the card 6 by a recipient. The removal process may be enhanced by application of a release agent (not illustrated) to the electret bottom surface 2*b*, as deemed necessary.

It will be further appreciated by a consideration of FIGS. 1 and 2 of the drawings that various combinations of the top surface electret indicia 3, bottom surface electret indicia 4, top surface card indicia 7 and bottom surface card indicia 8 may be used in any desired combination or embodiment of the electret and card assembly 1. For example, the electret 2 may be so positioned on the card 6 that the electret bottom surface 2*b* is facing upwardly, with the mailing information included in the bottom surface electret indicia 4, as illustrated in FIG. 2. This positioning of the electret 2 may be effected on the card top surface 6*a*, having the top surface cord indicia 7 provided thereon, as illustrated in FIG. 1. Other combinations are clearly possible in order to present the merchant or vendors' product or services in a favorable manner, either by direct hand-out or by mail.

Figure 3:
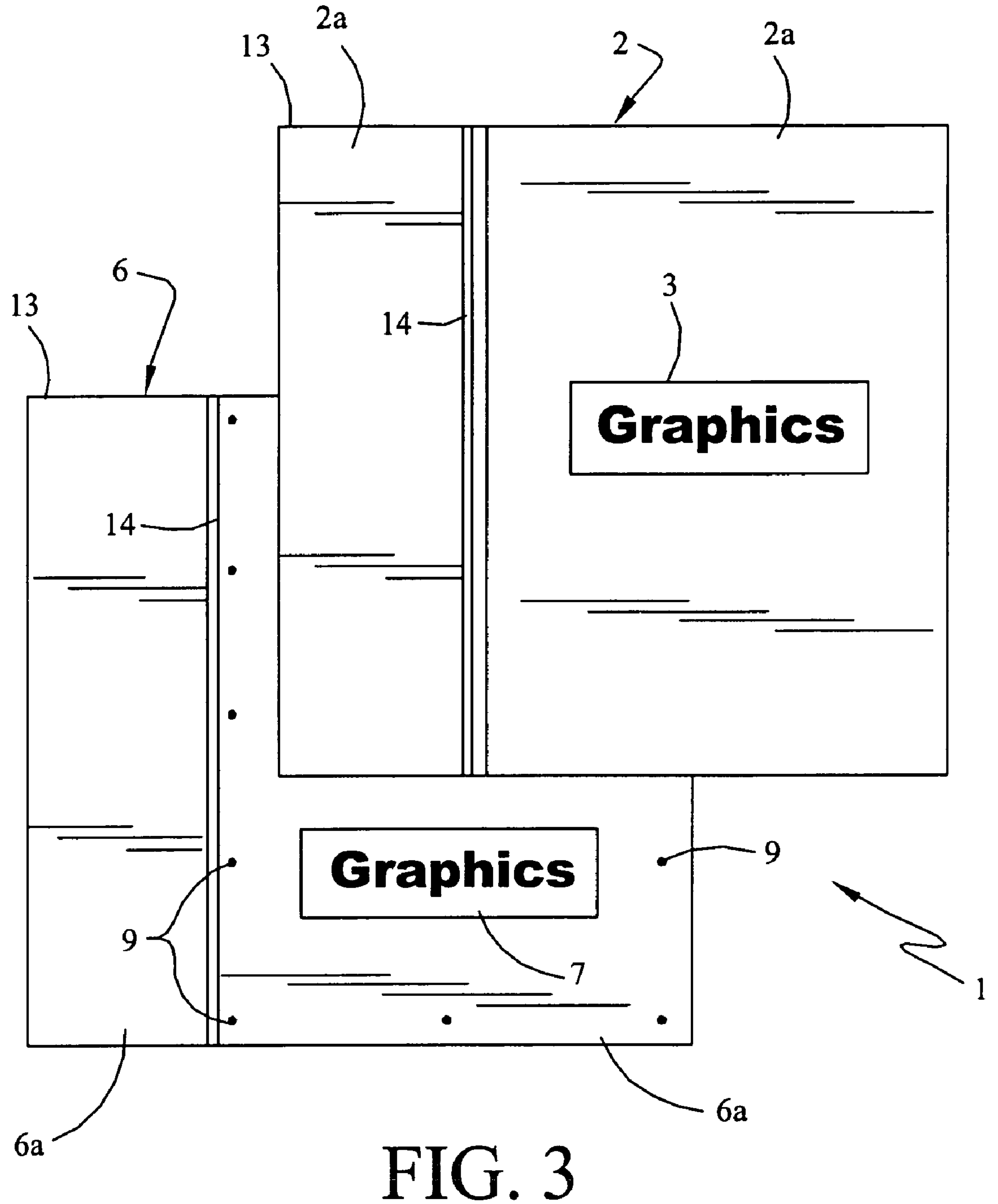
FIG. 3 is an exploded view of a typical magazine insert embodiment of the electret and card assembly of this invention.

Referring now to FIG. 3 of the drawings in a similar manner, a magazine insert embodiment of the electret and card assembly 1 is illustrated. The magazine insert electret and card assembly 1 has a card 6 of selected size, provided with vertical fold lines 14 and an insertion tab 13 and having top surface card indicia 7 provided thereon. An adhesive 9 is applied, typically in the configuration of spaced-apart dots, to the card top surface 6*a* for removably receiving a correspondingly-shaped electret 2. The electret 2 may have complimentary fold lines 14 and an insertion tab 13 that match these counterparts on the underlying card 6. Top surface electret indicia 3 graphics can be printed on the electret top surface 2*a* and top surface card indicia 7, on the card top surface 6*a*, as illustrated. The composite insertion tabs 13 of the electret and card assembly 1 can then be inserted in a magazine (not illustrated) and the insert used as an advertising tool, including a mail-out format, with the capability of extended advertising, responsive to application of the electret 2 element of the assembly to a refrigerator, window or door, as desired.

Referring again to FIG. 1 of the drawings, in a preferred embodiment of the invention, selected ones of the bottom card indicia 8 may be included in a die cut area or pattern 11, as desired. Moreover, the optional perforations 10 in the card 6 facilitate selective use of segments of the card 6, as in the case of the coupons, as heretofore described.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An electret and card assembly comprising a static cling film having film indicia provided on at least one side thereof; a card provided with card indicia on at least one side thereof; an adhesive provided on said card for removably receiving said static cling film; and a release agent provided on said static cling film for engaging said adhesive on said card and promoting selective, clean release of at least a portion of said static cling film from said card.

2. The electret and card assembly of claim 1 wherein said film indicia is provided on both sides of static cling film.

3. The electret and card assembly of claim 1 wherein said card indicia is provided on both sides of said card.

4. The electret and card assembly of claim 1 wherein:

(a) said film indicia is provided on both sides of said static cling film; and (b) said card indicia is provided on both sides of said card.

5. The electret and card assembly of claim 1 wherein a selected portion of said film indicia on said static cling film is die cut for removal of said selected portion of said film indicia from said card.

6. The electret and card assembly of claim 5 wherein:

(a) said film indicia is provided on both sides of said static cling film; and (b) said card indicia is provided on both sides of said card.

7. The electret and card assembly of claim 1 comprising perforations provided on said card at selected locations for selectively dividing said card into preselected perforated assembly elements.

8. The electret and card assembly of claim 7 wherein a selected portion of said film indicia on said static cling film is die cut for removal of said selected portion of said film indicia from said card.

9. The electret and card assembly of claim 8 wherein:

(a) said film indicia is provided on both sides of said static cling film; and (b) said card indicia is provided on both sides of said card.

10. An electret and card assembly comprising an electret film having film indicia provided on at least one side thereof and a release agent provided on one side thereof; a card provided with card indicia on at least one side thereof; and an adhesive provided on said card for removably receiving said one side of said electret film and exposing at least a portion of said card indicia on said card responsive to removal of at least a portion of said electret film from said card.

11. The electret and card assembly of claim 10 wherein:

(a) said film indicia is provided on both sides of said electret film; and (b) said card indicia is provided on both sides of said card.

12. The electret and card assembly of claim 10 wherein a selected portion of said film indicia on said electret film is die cut for removal of said selected portion of said film indicia from said card.

13. The electret and card assembly of claim 10 comprising perforations provided on said card at selected locations for selectively dividing said card into preselected perforated assembly elements.

14. The electret and card assembly of claim 10 comprising perforations provided on said card at selected locations for selectively dividing said card into preselected perforated assembly elements and wherein:

(a) a selected portion of said film indicia on said electret film is die cut for removal of said selected portion of said film indicia from said card; and (b) said film indicia is provided on both sides of said electret film and said card indicia is provided on both sides of said card.

* * * * *